United States Patent
Furukawa (10) Patent No.: US 6,243,022 B1
(45) Date of Patent: Jun. 5, 2001

(54) REMOTE CONTROL DEVICE USING TWO-WAY COMMUNICATION FOR A VEHICLE OPENING SYSTEM

(75) Inventor: Hideo Furukawa, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/150,431

(22) Filed: Sep. 9, 1998

(51) Int. Cl.[7] ................................................. G08C 19/00
(52) U.S. Cl. ............................ 340/825.72; 340/825.69; 340/5.32; 340/5.33; 340/539; 180/271; 49/28
(58) Field of Search .................... 340/825.31, 825.69, 340/825.72, 825.34, 825.37, 438, 539, 5.32, 5.33; 180/271; 49/28

(56) References Cited

U.S. PATENT DOCUMENTS

| | | | |
|---|---|---|---|
| 4,236,594 | * 12/1980 | Ramsperger | 180/271 |
| 4,422,521 | * 12/1983 | Mochida | 180/271 |
| 4,467,249 | 8/1984 | Swearingen, Jr. . | |
| 4,940,964 | 7/1990 | Dao . | |
| 5,069,000 | * 12/1991 | Zuckerman | 49/28 |
| 5,085,004 | 2/1992 | Beauprez . | |
| 5,382,948 | * 1/1995 | Richmond | 340/825.36 |
| 5,422,551 | 6/1995 | Takeda et al. . | |
| 5,461,826 | 10/1995 | Heckel et al. . | |
| 5,585,702 | 12/1996 | Jackson et al. . | |
| 5,585,705 | 12/1996 | Brieden . | |
| 5,616,997 | 4/1997 | Jackson et al. . | |
| 5,723,960 | 3/1998 | Harada . | |
| 5,739,747 | 4/1998 | Flick . | |
| 5,896,094 | * 4/1999 | Narisada et al. | 340/825.31 |
| 5,898,365 | * 4/1999 | Niederlein | 340/825.37 |
| 5,952,937 | * 9/1999 | Koopman et al. | 340/825.31 |

FOREIGN PATENT DOCUMENTS 6-32646    4/1994    (JP) .

OTHER PUBLICATIONS

"Automotive Industries" Mar. 1998, p. 87.

* cited by examiner

Primary Examiner—Brian Zimmerman
Assistant Examiner—Yves DaLencourt
(74) Attorney, Agent, or Firm—Squire, Snaders & Dempsey LLP.; David B. Abel (57) ABSTRACT

A two-way vehicle communication system includes a remote unit adapted to provide output signals to command opening and closing of a vehicle window, and a controller disposed in a vehicle and responsive to the output signals from the remote unit to operate the vehicle windows. The controller includes a vehicle opening device condition detector adapted to detect a condition of the vehicle window and provide a signal indicative of the detected condition. Thereafter, the controller transmits the detected condition signal to the remote unit. The remote unit further includes an indicating unit responsive to the detected condition signal for indicating to a user the vehicle window condition. The controller in the vehicle further includes an anti-pinching device adapted to sense presence of an object caught in the window as it is closed. The condition detector further detects a fully open or closed status of the window, and detects whether the anti-pinching device has sensed presence of an object caught in the window.

21 Claims, 6 Drawing Sheets

REMOTE CONTROL DEVICE USING TWO-WAY COMMUNICATION FOR A VEHICLE OPENING SYSTEM

BACKGROUND OF THE INVENTION

1. Field of the Invention

The present invention relates to remote controlled systems for motor vehicles, and more particularly, to a remote control device that safely controls the opening and closing of a vehicle window using a two-way communication link.

2. Description of Related Art

Remote control devices are widely used with motor vehicles for a variety of purposes, such as to arm/disarm security systems, to lock/unlock doors, and to unlatch the hood and/or trunk. A typical remote control device communicates encoded radio frequency (RF) signals to a processing unit disposed within the vehicle to command the execution of different functions within the vehicle. The remote control device may be small enough to serve as a key fob for holding the user's car keys, and may include a plurality of buttons associated with each of the functions controlled by the remote control device. The processing unit is generally adapted to emit an audible feedback signal in the form of a chirp to confirm successful completion of a desired function, e.g., arming of the vehicle security system.

One potential application for a remote control device is to command the opening and closing of a vehicle window from a remote location. For example, a user may want to open the vehicle windows before entering the vehicle, especially when the vehicle has become hot from sitting in direct sunlight. Conversely, a user may want to close the vehicle windows from a remote location, such as in response to a sudden rain storm. An example of a remote vehicle window control system is provided in U.S. Pat. No. 4,467,249, to Swearingen, Jr.

Notwithstanding the potential advantages of such a capability, remote control window opening/closing systems such as disclosed by Swearingen, Jr. have significant disadvantages that have prevented them from achieving commercial acceptance. Most significantly, there is an inherent safety risk attendant with such remote window operation, as a motor powered window can potentially cause harm to objects that are caught within the open window as the window closes. Even when this particular risk of harm is not present, the user cannot confirm successful completion of a remote window operation without directly observing the operation of the vehicle window. Such observation generally requires the user to be close enough to the vehicle so as to diminish the advantage of remote control operation.

Another disadvantage of the conventional vehicle remote control devices is that the chirp that serves as the audible feedback signal from the processing unit is often unnecessarily obtrusive. The chirp must necessarily be loud enough for the user to hear from a location somewhat distant from the vehicle. In addition, the volume of the chirp is often intentionally selected to be very high so as to serve as a warning to potential vehicle intruders of the presence of the security system. Nevertheless, the prevalence of vehicle security systems in urban areas has significantly diminished the deterrent effect of the chirp. More typically, the loud chirp constitutes a source of annoyance to the vehicle user's neighbors, and can be startling to pedestrians that pass near the vehicle when the chirp occurs.

Thus, it would be desirable to provide a remote control device that can be safely used to open and close vehicle windows while preventing the risk of harm to objects present in the open window. It would be further desirable to provide direct feedback of the remote controlled window operation and status to the user in a discrete manner through the remote control device.

SUMMARY OF THE INVENTION

In accordance with the teachings of the present invention, a system for remotely controlling operation of a vehicle window provides two-way communication between the remote control unit and the window control system within the vehicle. This way, the remote unit receives a signal from the window control system that indicates the current status of the windows, including whether the windows have reached a fully open or closed position, or whether an object has become pinched by the closing window.

More particularly, the system includes a remote unit adapted to provide output signals to command opening and closing of a vehicle window, and a controller disposed in the vehicle and responsive to the output signals from the remote unit to operate the vehicle windows. The controller includes a vehicle opening device condition detector adapted to detect a condition of the vehicle window and provide a signal indicative of the detected condition. Thereafter, the controller transmits the detected condition signal to the remote unit. The remote unit further includes an indicating unit responsive to the detected condition signal for indicating to a user the vehicle window condition. The controller in the vehicle further includes an anti-pinching device adapted to sense presence of an object caught in the window as it is closed. The condition detector further detects a fully open or closed status of the window, and detects whether the anti-pinching device has sensed presence of an object caught in the window.

In an embodiment of the invention, the indicating unit further comprises a visual display device adapted to display the vehicle opening device condition, such as a liquid crystal display. The indicating unit may further include an audible device, such as a buzzer, which emits a series of sounds when the window is opening or closing. The audible device may also emit an audible warning signal upon an interruption of transmission of the detected condition signal from the controller. The visual display device and audible device provide verification to the user of the commanded status of the vehicle window, without the obtrusive vehicle chirp used with convention remote control devices.

A more complete understanding of the remote control device having two-way communication for a vehicle opening system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a remote control device that can be safely used to open and close vehicle windows while preventing the risk of harm to objects present in the open window. The remote control device provides direct feedback of the remote controlled window operation and status to the user in a discrete manner. In the detailed description that follows, like element numerals are used to describe like elements illustrated in one or more of the figures.

Figure 1:
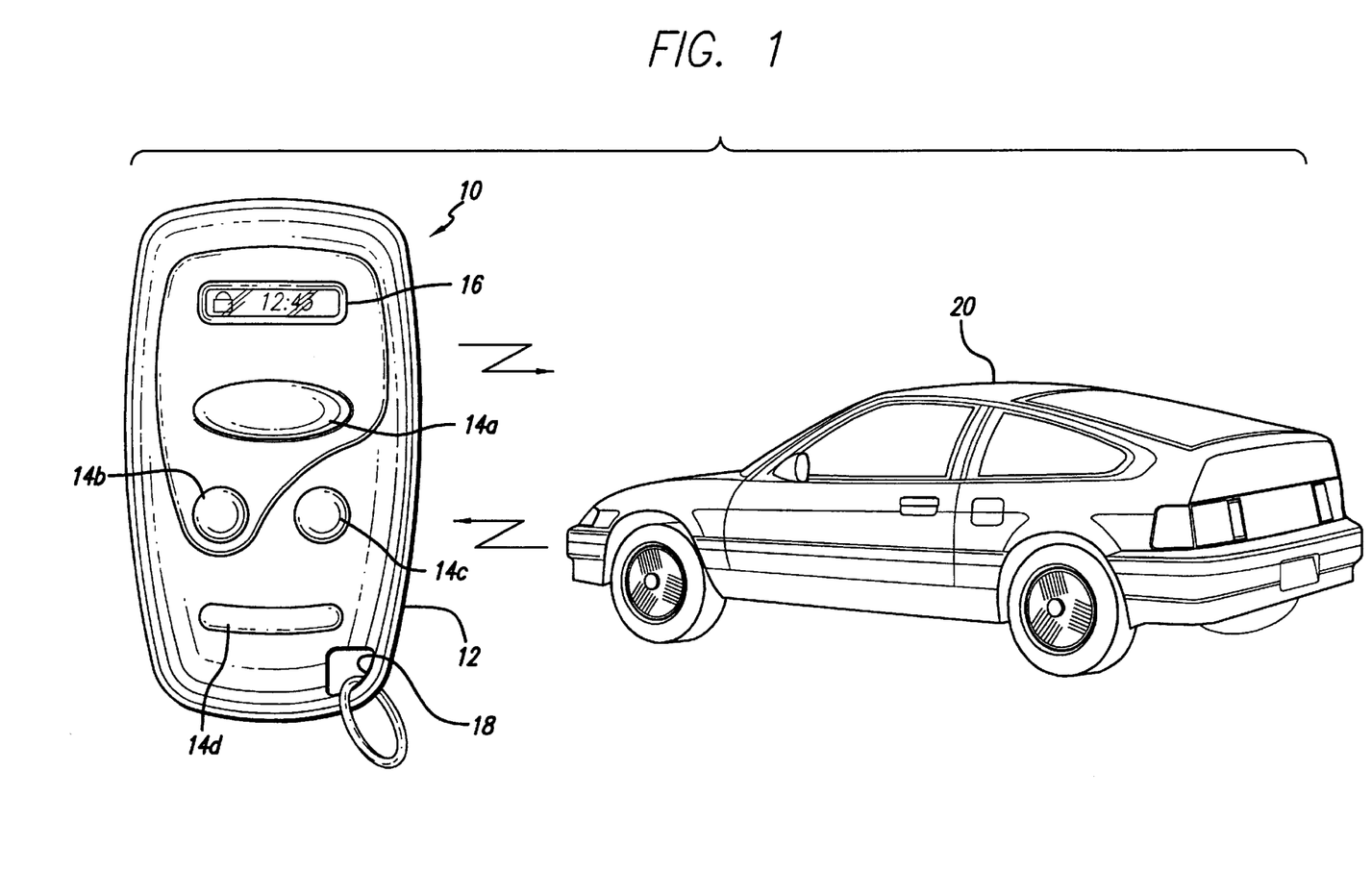
FIG. 1 illustrates a remote control device according to the present invention in communication with a vehicle.

Referring first to FIG. 1, a remote control device 10 according to the present invention is illustrated in communication with a vehicle communication module disposed within a vehicle 20. As will be further described below, the remote control device 10 and the vehicle communication module communicate together over a two-way communication link. Particularly, the remote control device 10 transmits encoded command messages to the vehicle communication module to command the performance of certain functions, such as locking/unlocking vehicle doors and opening/closing vehicle windows. The vehicle communication module relays commands to a window control module for execution, and transmits encoded reply messages back to the remote control device 10 which acknowledge receipt of the command messages and indicate completion of a commanded function.

The remote control device 10 further comprises a key fob including a housing 12, function keys 14a–14d, and a display 16. Function key 14a is primarily used for locking the vehicle doors and arming the vehicle security system. Function key 14b is primarily used for unlocking the vehicle doors and disarming the vehicle security system. Function keys 14a, 14b are also used for closing and opening the vehicle windows, respectively, by holding the keys down for a longer duration, e.g., for three seconds. Function key 14c is primarily used for unlatching the vehicle trunk. Function key 14d is primarily used as a "panic" button, which can be used to set off the vehicle alarm in an emergency situation. The function keys 14a–14d may also be used in combination to perform other functions, as is generally known in the art. The function keys 14a–14c may be provided by conventional momentary contact switches.

The remote control device 10 further includes a loop 18 to permit the attachment of a vehicle key ring thereto. The housing 12 of the remote control device 10 may be constructed of a lightweight material, such as plastic, and may further include a space on which the vehicle model name or logo may be displayed. A back portion (not shown) of the remote control device 10 may be removable to permit periodic replacement of a battery disposed therein. The remote control device 10 further includes a buzzer or speaker (not shown) to provide an audible feedback signal to user.

The display 16 includes space for a plurality of alphanumeric characters, and may be provided by a liquid crystal display (LCD) or other like data display device. In an exemplary embodiment of the invention, the display 16 displays the status words "WINDOW OPENED" to indicate a window fully open condition, the status words "WINDOW CLOSED" to indicate a window fully closed condition, and the status words "WINDOW PINCH" to indicate a window pinched condition. Other status words may be displayed in a similar manner to reflect other conditions of the vehicle, such as: "OUT OF RANGE" to reflect that the remote control device 10 is out of communicating range with the vehicle; "OVERRIDE" to reflect that the user has overridden the vehicle alarm system; "TRUNK OPEN" to reflect that the vehicle trunk is opened; "ARMED" to reflect that the vehicle alarm system is in an armed state and that all vehicle doors have been locked; and "WELCOME [user's name]" to be displayed as a customized greeting to the user that can be modified to insert the user's name. The display 16 may also show other status words as reminders to take certain actions in response to detected conditions, such as the status words "CHECK DOORS" when it is detected that one or more doors are ajar, the status words "CHECK TRUNK" when it is detected that the trunk is open, and "CHECK HOOD" when it is detected that the hood is open.

The display 16 also includes space for an icon reflecting the locked condition of the vehicle. As shown in FIG. 1, an icon depicting a closed padlock indicates that the vehicle is in a locked condition. Conversely, an icon depicting an open padlock (not shown) indicates that the vehicle is in an unlocked condition. When the remote control device 10 is not being utilized to control operation of the various vehicle functions described herein, the display 16 may show the time, date or other such information. The remote control device 10 may further include the capability to permit the user to program personalized status words or icons for presentation on the display 16.

Figure 2:
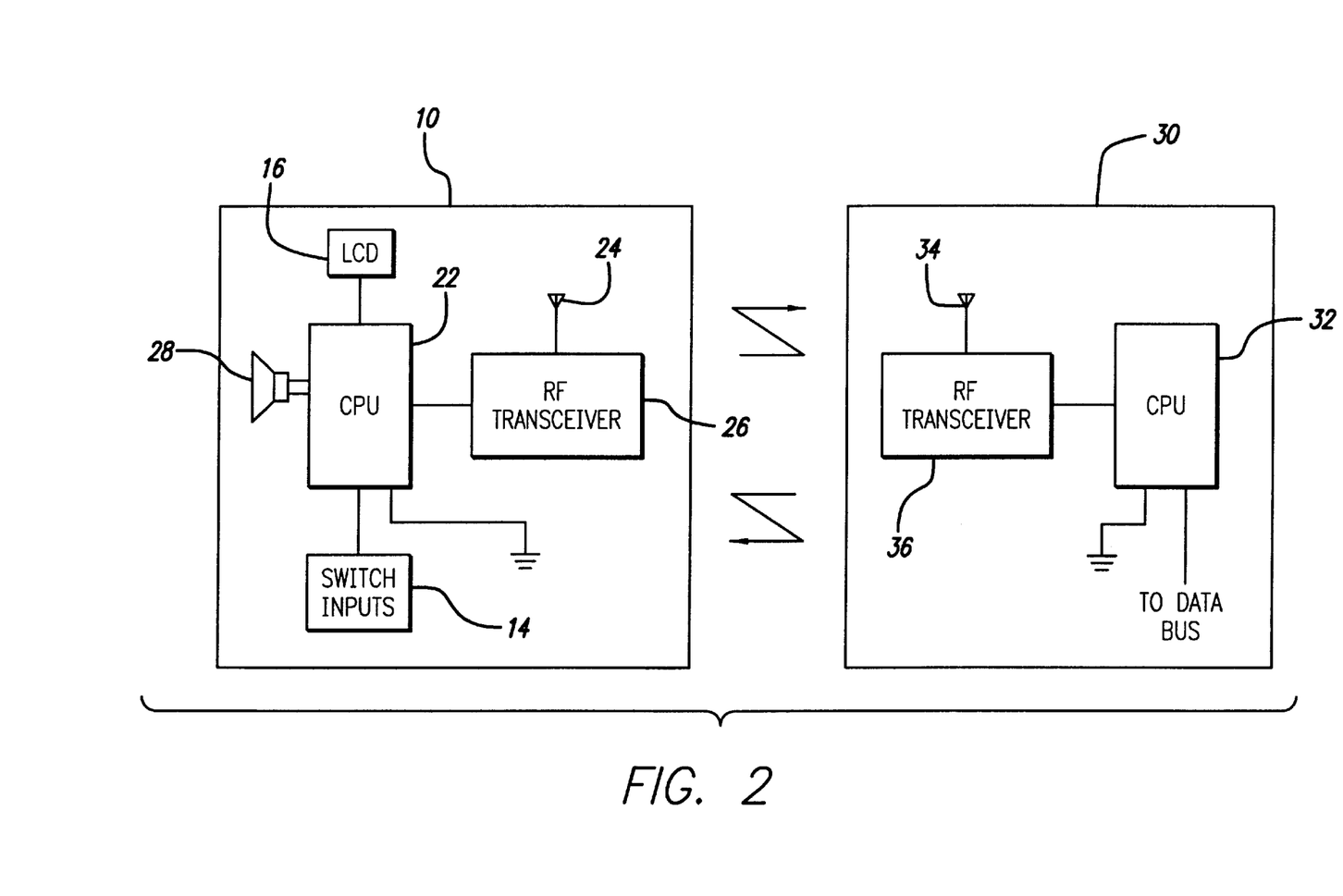
FIG. 2 is a block diagram illustrating the remote control device in communication with a vehicle communication module within the vehicle.

A block diagram of the remote control device 10 in communication with a vehicle communication module 30 disposed within the vehicle 20 is shown in FIG. 2. The remote control device 10 further comprises a central processing unit (CPU) 22, an antenna 24, an RF transceiver 26, and a buzzer 28. The CPU 22 controls the operation of the remote control device 10, and may be provided by a microprocessor, microcontroller, application specific integrated circuit (ASIC), or other like electronic device. The remote control device 10 may further include a memory either as a separate component or embedded within the CPU 22 containing stored instructions to be executed by the CPU, e.g., a software or firmware program. The CPU 22 provides output signals to the display 16 and the buzzer 28. The function keys 14a–14d are coupled to the CPU 22 to permit input of function commands by the user. The operation of the display 16, the function keys 14a–14d, and the buzzer 28 are described above.

It should be appreciated that the display 16, function keys 14a–14d, and speaker 28 may further include separate driver circuits to operate with the CPU 22 as generally known in the art. For example, the display 16 may further include local memory for holding the transferred information to be displayed. Other conventional display and memory management techniques known to those skilled in the art may be employed. The display memory may alternatively be provided by the memory of the CPU 22, with the CPU transferring display content directly to the display 16 as required. It should also be understood that the remote control device 10 will also necessarily include a battery (not shown) providing a DC power source for the CPU 22, the display 16 and the RF transceiver 26. Further, a speaker or other sound generating device may be utilized instead of the buzzer 28.

The antenna 24 and RF transceiver 26 enable the CPU 22 to communicate with the vehicle communication module 30 over a two-way RF communication channel. The antenna 24 is tuned to receive/transmit RF signals within a desired frequency range covered by the RF communication channel. The RF transceiver 26 is coupled to the antenna 24 and is adapted to demodulate received RF signals from the antenna 24 to recover the digital data contained in the RF signals, and provide the digital data to the CPU 22. The RF transceiver 26 is also adapted to modulate digital data from the CPU 22 onto an RF carrier for transmission to the vehicle communication module 30. The RF transceiver 26 may further include a frequency synthesizer or crystal oscillator to generate an oscillating signal used for demodulating the received RF signals and modulating the digital data for transmission. Various known modulation schemes, such a frequency shift keying (FSK) modulation, may be utilized by the RF transceiver 26. As known in the art, a single antenna may be utilized for both receiving and transmitting RF signals under control of a switch, or, alternatively, separate antennas may be utilized for receiving and transmitting the RF signals.

The vehicle communication module 30 further comprises a CPU 32, an antenna 34, and an RF transceiver 36. The CPU 32 controls the operation of the vehicle communication module 30, and may be provided by a microprocessor, microcontroller, application specific integrated circuit (ASIC), or other like electronic device. The antenna 34 and RF transceiver 36 are similar to the corresponding elements of the remote control device 10, and enable the CPU 32 to communicate with the remote control device over the two-way RF communication channel. The CPU 32 includes an input/output terminal coupled to a data bus of the vehicle 20 for communication of serial data signals to/from the CPU. As with the remote control device 10 discussed above, the vehicle communication module 30 may further include a memory either as a separate component or embedded within the CPU 32 containing stored instructions to be executed by the CPU, e.g., a software or firmware program. The vehicle communication module 30 will also be coupled to a DC power source of the vehicle 20.

Figure 3:
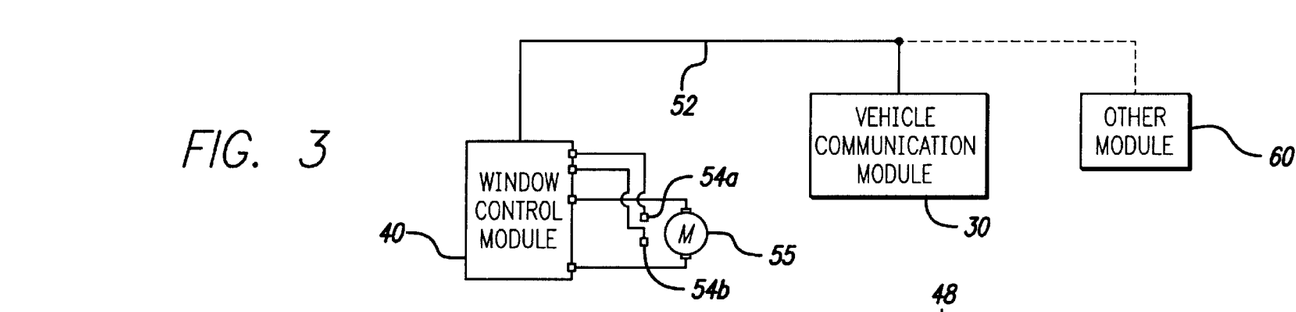
FIG. 3 is a block diagram illustrating interconnection of the vehicle communication module, a window control module, and other modules.

FIG. 3 illustrates the interconnection of the vehicle communication module 30 with a window control module 40 via a serial data bus 52. The input/output terminal of the CPU 32 of the vehicle communication module 30 described above is coupled to the data bus 52. It should be appreciated that the modular construction and interconnecting data bus 52 permit the addition of other functional elements to the vehicle, such as the other module 60. For example, one additional module may provide the vehicle security system, and signals from the remote control device 10 concerning the vehicle security functions would be routed in a similar manner through the vehicle communication module 30 and the serial data bus 52 to the vehicle security module. Another module may control the locking/unlocking of vehicle doors and unlatching of the vehicle trunk. Signals from the remote control device 10 concerning these functions would be routed through the vehicle communication module 30 and the serial data bus 52 in a like manner.

Figure 4:
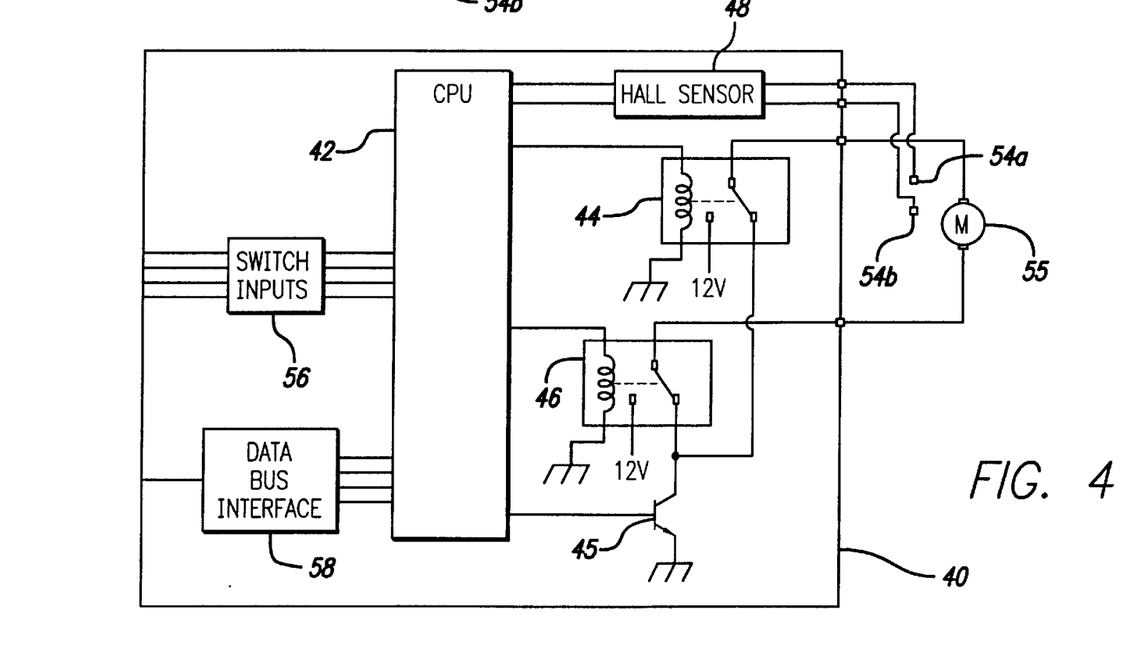
FIG. 4 is a block diagram illustrating the window control module.

The window control module 40 provides for control over the vehicle windows, and is illustrated in greater detail in FIG. 4. More particularly, the window control module 40 includes a CPU 42, a opening relay 44, a closing relay 46, and a Hall sensor interface 48. The CPU 42 controls the operation of the vehicle windows, and may be provided by a microprocessor, microcontroller, application specific integrated circuit (ASIC), or other like electronic device. The CPU 42 is further coupled to a switch input interface 56 and a data bus interface 58. The switch input interface 56 receives signals from switches disposed in the vehicle which are operable by a vehicle user to command the opening and closing of the windows. The data bus interface 58 communicates with the data bus 52 to input serial data comprising command signals from the vehicle communication module 30, and to output serial data comprising window status information to the vehicle communication module. The data bus interface 58 serves as a multiplexer to control the flow of data between the window control module 40 and the data bus 52.

The window control module 40 is further coupled to a motor 55, and Hall sensor elements 54a, 54b. The motor 55 further comprises a DC motor mechanically coupled to the vehicle window, such that the window is driven up if a positive DC voltage is applied across the motor terminals, and the motor is driven down if a negative DC voltage is applied across the motor terminals. Each of the opening relay 44 and the closing relay 46 include a trigger terminal coupled to an inductive coil, a pole terminal coupled to the pole of a switch, and a pair of switch terminals. The opening relay 44 and the closing relay 46 are each coupled to the CPU 42, with the opening relay 44 having a pole terminal coupled to one of the motor terminals and the closing relay 46 having a pole terminal coupled to the other one of the motor terminals. A first switch terminal of each of the opening and closing relays 44, 46 is coupled to a DC voltage source, and a second switch terminal is coupled to ground through a transistor 45.

The poles of the opening and closing relays 44, 46 are normally biased to the second switch terminal, so that the motor terminals are each coupled to ground and there is no DC potential across the motor terminals. To command the window to open, the CPU 42 provides a signal to the opening relay 44 causing its pole to switch to the first switch terminal. This couples one of the motor terminals to the DC voltage source, causing the motor 55 to drive in a first direction to open the window. Conversely, to command the window to close, the CPU 42 provides a signal to the closing relay 46 causing its pole to switch to the first switch terminal. This couples the other one of the motor terminals to the DC voltage source, causing the motor 55 to drive in a second direction to close the window.

The motor 55 further includes an annular magnet mounted on the rotary shaft of the motor. The Hall sensor elements 54a, 54b are disposed around the magnet and spaced from each other by 90°. The Hall sensor elements 54a, 54b detect the poles of the magnet to generate electrical currents. This way, as the magnet rotates, the Hall sensor elements 54a, 54b provide pulse signals having a frequency corresponding to the speed of rotation of the magnet. The Hall sensor interface 48 receives the pulse signals from the Hall sensor elements 54a, 54b, and provides signals to the CPU 42 corresponding to the velocity and direction of movement of the magnet, and hence the window. The CPU uses the velocity and direction information to determine whether an object has become lodged between the window and the window frame, i.e., a "pinched" condition, whereupon further closing of the window is halted and the motor reversed to open the window. The window control module 40 of FIG. 4 may be adapted to control more than one vehicle window, or alternatively, separate window control modules may be included for each vehicle window requiring control. Each of the separate window control modules would then be coupled to the vehicle communication module 30 through the serial data bus 52 in the manner described above.

Referring now to FIGS. 5*a*–5*c* and 6*a*–6*e*, the operation of the remote control device 10 in association with the vehicle communication module 30 and window control module 40 is illustrated. The remote control device 10 operates in a continuous program loop executed by the CPU 22. At step 101 of FIG. 6*a*, various processes within the CPU 22 are initialized by setting internal registers and counters within the memory to initial values as is well known in the art. It should be appreciated that this first step is only performed when power is initially applied to the remote control device 10, such as following the replacement of the battery. Otherwise, the remote control device 10 is continuously operating within the program loop described below.

After the initialization step 101, the time of day is displayed in the LCD display 16 at step 102. As known in the art, this step may further include sub-program steps for enabling the setting of the correct time and sub-program steps for maintaining an accurate time count. It should also be understood that the displaying of the time may further encompass the loading of time values into a buffer which refreshes the display at a desired rate to avoid flickering of the display which would be visually unpleasant for the user. At step 103, the function keys 14*a*–14*d* are scanned to detect any change in status, i.e., depression of a key by the user. As noted above, certain of the function keys 14*a*–14*d* are used for multiple functions determined by the amount of time that a corresponding key is depressed. At step 104, the CPU 22 determines whether a function key depression signals one of four specific functions, including: (1) door lock/arm security system, (2) door unlock/disarm security system, (3) window open, or (4) window close. If no key depression has been detected, the program returns to step 102 (indicated as A in FIG. 6*a*). Depending upon the particular function detected at step 104, the program executes one of four sub-programs, including (1) the door lock subprogram 200; (2) the door unlock sub-program 300; (3) the window open sub-program 400; and, (4) the window close sub-program 500. It should be appreciated that other functions may also be detected in a similar manner, such as setting off the vehicle alarm pursuant to the "panic" button of function key 14*d*, opening the trunk, etc.

More particularly, if a door lock function was detected at step 104, the door lock sub-program begins at step 201 (FIG. 6*b*) and a door lock signal is transmitted by the remote control device 10 at step 202. Similarly, if a door unlock function was detected at step 104, the door unlock sub-program begins at step 301 (FIG. 6*c*) and a door unlock signal is transmitted by the remote control device 10 at step 302; if a window open function was detected at step 104, the window open sub-program begins at step 401 (FIG. 6*d*) and a window open signal is transmitted by the remote control device 10 at step 402; and, if a window close function was detected at step 104, the window close sub-program begins at step 501 (FIG. 6*e*) and a window close signal is transmitted by the remote control device 10 at step 502; Thereafter, the vehicle communication module transmits an acknowledgment (ACK) signal back to the remote control device 10. The ACK signal indicates that the vehicle communication module 30 has received and has begun executing the particular command. As described previously, the vehicle communication module 30 sends a digital signal on the data bus 52 to the appropriate module for further processing of the corresponding command.

Figure 5A:
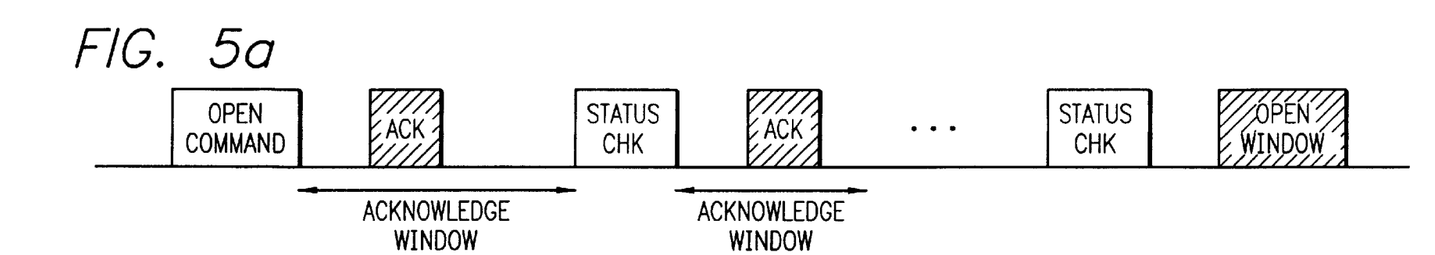
FIGS. 5a–5c are timing diagrams illustrating communication of signals between the remote control device and the vehicle communication module.
Figure 5B:
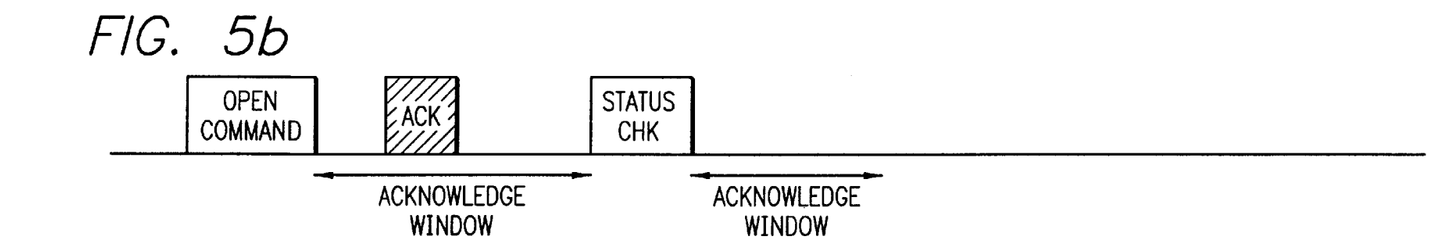
Figure 5C:
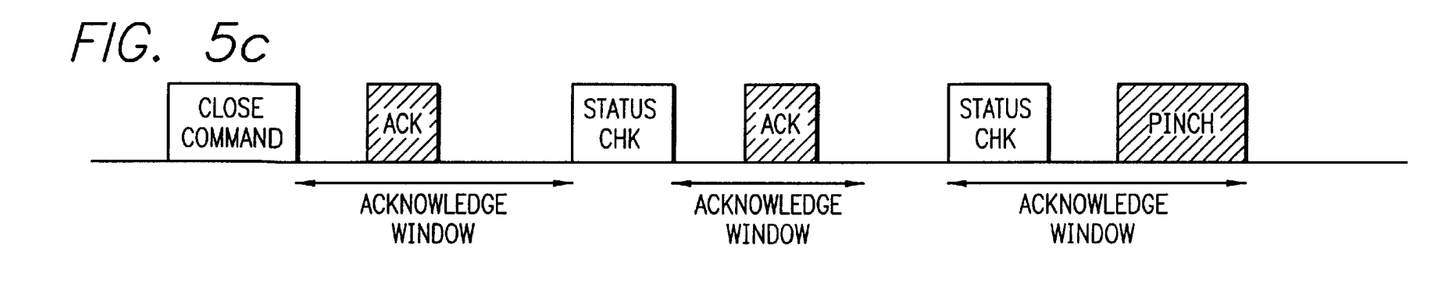

At steps 203, 303, 403, and 503, the remote device 10 determines whether the corresponding ACK signal has been received. As illustrated in FIGS. 5*a*–5*c*, an acknowledge window is defined during which the corresponding ACK signal is expected to be received. If no ACK signal is received during the associated acknowledge window, it is concluded that the original function signal was not received or processed by the vehicle communication module 30 due to an out of range condition. Then, at steps 205, 305, 404 and 507, respectively, the display 16 shows the status word "OUT OF RANGE" to indicate that the remote device 10 is not communicating with the vehicle communication module 30, and the buzzer 28 is pulsed in a unique manner at steps 206, 306, 406 and 508, respectively. Thereafter, the program returns to the beginning at step 102 (point A) of FIG. 6*a*.

With respect to the door lock sub-program, if an ACK signal is received at step 203, then at step 204 the display 16 shows an icon depicting a closed padlock indicating that the vehicle is locked and the security system is armed. Similarly, with respect to the door unlock sub-program, if an ACK signal is received at step 303, then at step 304 the display 16 shows an icon depicting a open padlock indicating that the vehicle is unlocked and the security system is disarmed. In addition to displaying the icon, the remote device 10 can pulse the buzzer 28 in a unique manner to indicate the vehicle condition. Thereafter, the program returns to the beginning at step 102 (point A) of FIG. 6*a*. In an exemplary embodiment of the invention, the door locked or unlocked icon will remain displayed continuously along with the current time. This way, the user can simply look at the display 16 on the remote control device 10 to determine whether the doors of the vehicle had been left in a locked or unlocked state.

Figure 6A:
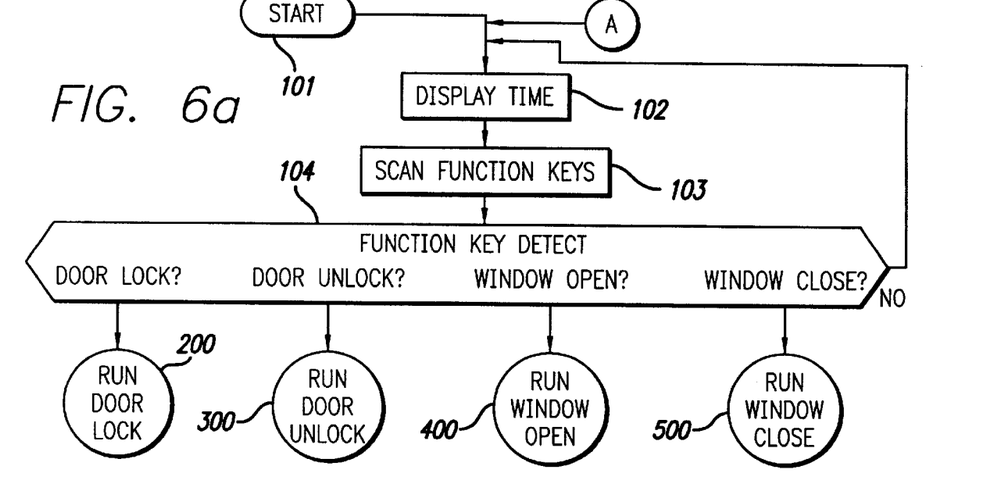
FIGS. 6a–6e are flow charts illustrating functional operation of the remote control device in association with the vehicle communication module and the window control module.
Figure 6B:
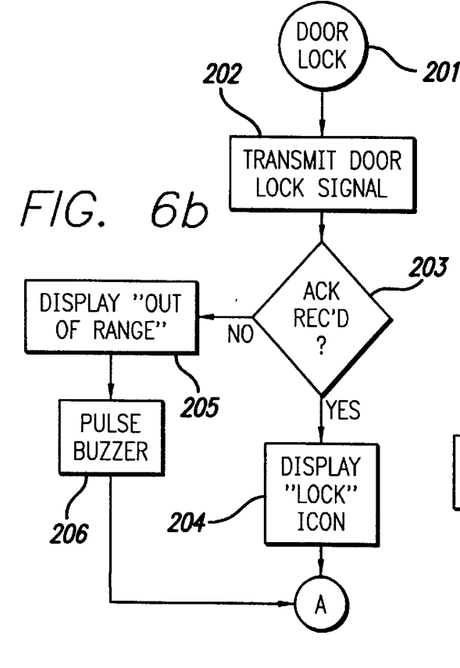
Figure 6C:
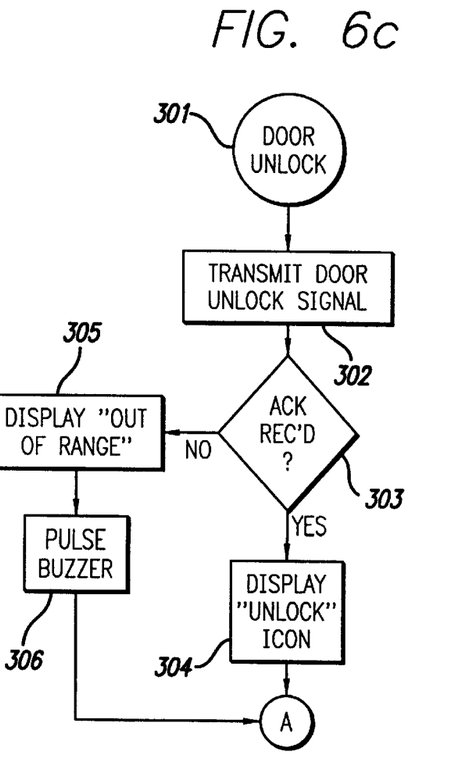
Figures 6D, 6E:
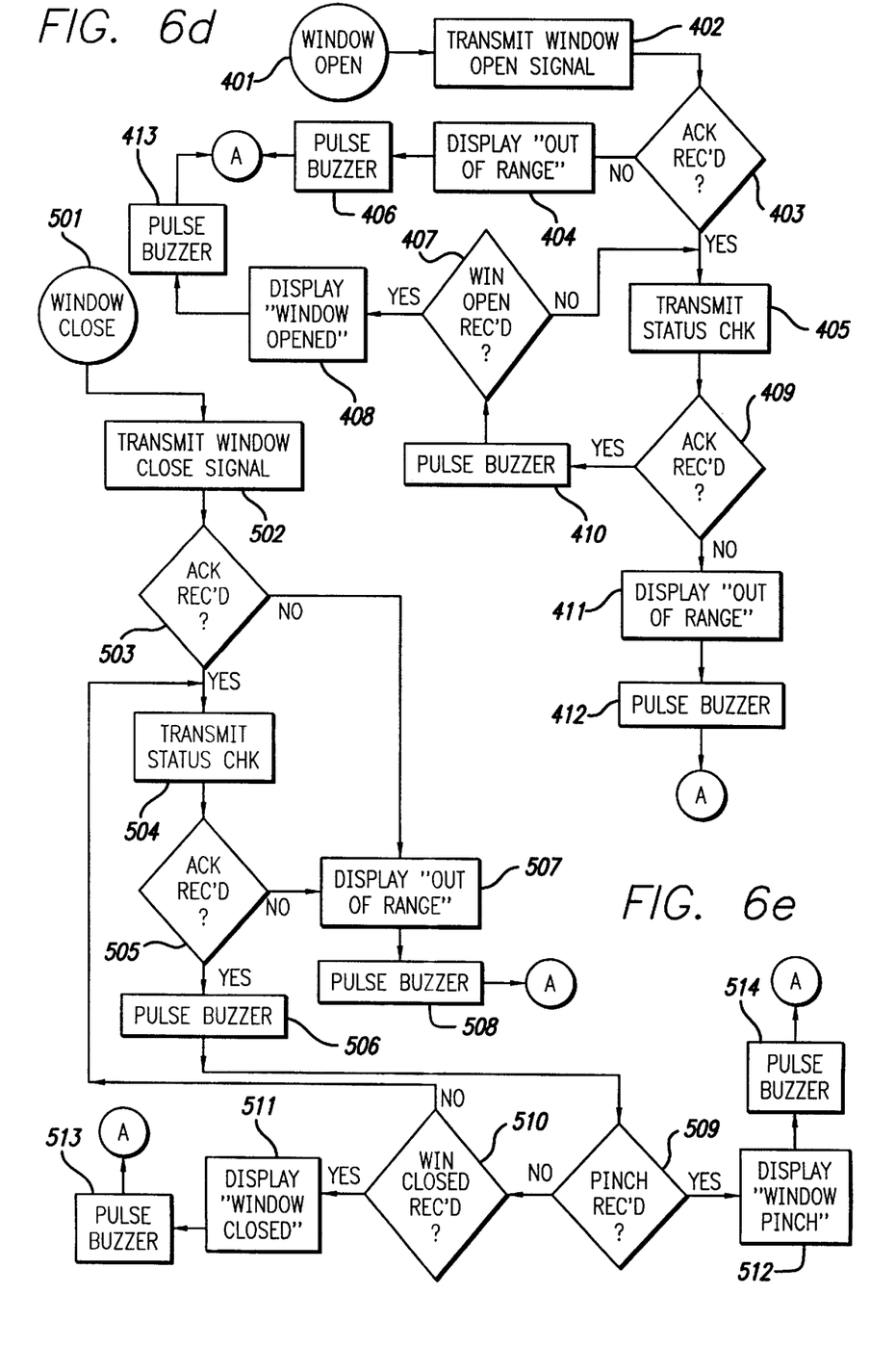

With respect to the window open and window close sub-programs, FIGS. 5*a* and 5*b* illustrate the transmission of a window open signal, and FIG. 5*c* illustrates the transmission of a window close signal. As shown in FIG. 6*d*, following transmission of a window open signal at step 402, and receipt of an ACK signal at step 403, the window control module 40 commands the opening of the vehicle windows in the manner discussed above. During the period of time that the windows are being opened, the remote control device 10 transmits a periodic status check signal at step 405. A status check signal is illustrated in FIGS. 5*a* and 5*b*. If the vehicle communication module 30 receives the status check signal, it transmits an ACK signal that indicates that the windows are in the process of opening and that the status check signal was properly received. At step 409, the remote control device 10 monitors for the receipt of the ACK signal during an acknowledge window, as shown in FIGS. 5*a* and 5*b*.

In FIG. 5*a*, the ACK signal is received during the acknowledge window, causing the buzzer 28 to be pulsed at step 410, providing an audible indication to the user that the window is in the process of opening. Next, at step 407, the remote control device 10 monitors for the receipt of a signal from the vehicle communication module 30 indicating that the window has reached a fully open state. If the window open signal is not received at step 407, the program loops back to step 405 and another status check signal is transmitted by the remote control device 10. Steps 405, 409, 410 and 407 may repeat several times before the window open signal is received, as shown in FIG. 5*a*. Once the window open signal is received, at step 408, the display 16 shows the status words "WINDOW OPENED" to indicate to the user that the windows are fully open, and the buzzer is pulsed at step 413. Thereafter, the program returns to the beginning at step 102.

Conversely, in FIG. 5*b*, the ACK signal is not received during the acknowledge window following transmission of the status check at step 405, indicating a break in communication between the remote device 10 and the vehicle communication module 30. The vehicle communication module 30 will also recognize that a subsequent periodic status check signal was not received, indicating the break in communication. Accordingly, further opening of the vehicle windows is discontinued by the window control module 40. The display 16 shows the status word "OUT OF RANGE" at step 411 and the buzzer 28 is pulsed at step 412 in the manner described above after determining that the ACK signal was not received at step 409 to notify the user of the break in communications. Thereafter, the program returns to the beginning at step 102 of FIG. 6a (point A).

Following transmission of a window close signal at step 502 of FIG. 6e, and receipt of an ACK signal at step 503, the window control module 40 commands the closing of the vehicle windows in the manner discussed above. During the period of time that the windows are being closed, the remote control device 10 transmits a periodic status check signal at step 504, as illustrated in FIG. 5c. In the same manner described above with respect to the window opening subprogram, the vehicle communication module 30 transmits an ACK signal that indicates that the windows are in the process of closing and that the status check signal was properly received. At step 505, the remote control device 10 monitors for the receipt of the ACK signal during an acknowledge window.

If the ACK signal is not received during the acknowledge window, the display 16 shows the status word "OUT OF RANGE" at step 507 and the buzzer 28 is pulsed at step 508 in the manner described above. The program then returns to the beginning at step 102 of FIG. 6a (point A). If the ACK signal is received during the acknowledge window, however, the buzzer 28 is pulsed at step 506 in a different manner to provide an audible indication to the user that the window is in the process of closing. At step 509, the remote control device 10 monitors for the receipt of a pinch signal from the vehicle communication module 30 indicating that the window has entered a pinched condition. As noted above, the window control module 40 halts closing of the window and reverses direction of the window if a pinched condition is detected. The vehicle communication module 30 transmits a pinch signal accordingly. If the pinch signal is detected at step 512, the display 16 shows the status word "WINDOW PINCH" to indicate a window pinched condition to the user, and the buzzer is pulsed at step 514. Thereafter, the program returns to the beginning at step 102 of FIG. 6a.

If no pinch signal is detected at step 509, the remote control device 10 monitors for the receipt of a window closed signal from the vehicle communication module 30 at step 510 indicating that the window has fully closed. As long as the window closed signal is not received, the program continues to loop through steps 504, 505, 506, 509 and 510 until the window closed signal is received. Then, at step 511, the display 16 shows the status word "WINDOW CLOSED" to indicate to the user that the windows are fully closed, and the buzzer is pulsed at step 513. Thereafter, the program returns to the beginning at step 102 of FIG. 6a (point A).

It should be appreciated that the communication between the remote control device 10 and the vehicle communication module 30 of the status checks and corresponding ACK signals ensures safe remote operation of the vehicle windows. When a user opens or closes windows using the remote control device 10, the user is notified by audible signals that the vehicle is responding by opening or closing the windows. If there is a break in communication between the remote control device 10 and the vehicle communication module 30, all movement of the windows is halted and the user is notified by the status words "OUT OF RANGE" and the buzzer. Upon the windows reaching either a fully open or closed position, the user is notified by a visual indication on the display 16. If a pinched condition is experienced during closing of the windows, the user is notified and the windows are reversed in direction to cancel the pinched condition. Lastly, when the vehicle is locked and the security system is armed, the user is notified discretely with an icon on the remote control device or by sounding the buzzer or by displaying the status word "ARMED," avoiding the use of the obtrusive and annoying vehicle chirp.

Having thus described a preferred embodiment of a remote control device having two-way communication for a vehicle opening system, it should be apparent to those skilled in the art that certain advantages of the aforementioned system have been achieved. It should also be appreciated that various modifications, adaptations, and alternative embodiments thereof may be made within the scope and spirit of the present invention. The invention is further defined by the following claims.

What is claimed is:

1. A system for remotely controlling a vehicle opening device, comprising:

a remote unit which provides output signals to command opening and closing of a vehicle opening;

a controller disposed in said vehicle and being responsive to said output signals from said remote unit to operate said vehicle opening device, said controller including a vehicle opening device condition detector which detects a condition of said vehicle opening device and provides a signal indicative of the detected condition, said controller transmitting said detected condition signal to said remote unit;

said remote unit including an indicating unit responsive to said detected condition signal for indicating to a user said vehicle opening device condition; and wherein said indicating unit further comprises a display device which displays said opening device condition in a text form.

2. The system of claim 1, wherein said indicating unit further comprises a liquid crystal display.

3. The system of claim 1, wherein said vehicle opening device includes an anti-pinching device which senses a presence of an object caught in said vehicle opening device.

4. The system of claim 3, wherein said condition detector further detects a fully open or closed status of said vehicle opening device, and detects whether said anti-pinching device has sensed presence of an object caught in said vehicle opening device.

5. The system of claim 1, wherein said detected condition further comprises opening or closing of said vehicle opening device, said indicating unit providing a continuous indication to said user when said vehicle opening device is opening or closing.

6. The system of claim 5, wherein said indicating unit further comprises an audible device, said audible device emitting a series of sounds when said vehicle opening device is opening and closing.

7. The system of claim 1, wherein said controller stops a closing of said vehicle opening device upon interruption of said detected condition signal from said controller.

8. The system of claim 7, wherein said indicating unit further comprises an audible device, said audible device emitting an audible warning signal upon said interruption of said detected condition signal from said controller.

9. The system of claim 1, wherein said vehicle opening device further comprises a window.

10. The system of claim 1, wherein said indicating unit further comprises an audible device.

11. The system of claim 1, wherein said output signals from said remote unit further comprises periodic status check signals.

12. The system of claim 11, wherein said controller provides acknowledge signals in response to said periodic status check signals.

13. The system of claim 1, wherein said controller halts operation of said vehicle opening device if one of said periodic status check signals is not received.

14. A method for remotely controlling a vehicle opening device, comprising the steps of:

provadiing output signals from a remote unit to said vehicle for commanding opening and closing of a vehicle opening;

operating said vehicle opening device in response to said output signals;

detecting a condition of said vehicle opening device and transmitting a signal indicative of the detected condition to said remote unit;

indicating to a user through said remote unit said vehicle opening device condition in response to said detected condition signal; and wherein said indicating step further comprises visually displaying said vehicle opening device condition in a text form.

15. The method of claim 14, wherein said step of detecting a condition of said vehicle opening device further comprises detecting a fully open or closed status of said vehicle opening device.

16. The method of claim 14, further comprising the step of sensing presence of an object caught in said vehicle opening device.

17. The method of claim 16, wherein said step of detecting a condition of said vehicle opening device further comprises detecting whether presence of an object caught in said vehicle opening device has been sensed.

18. The method of claim 14, further comprising the step of stopping closing of said vehicle opening device upon interruption of said detected condition signal.

19. The method of claim 18, wherein said indicating step further comprises emitting an audible warning signal upon said interruption of said detected condition signal.

20. The method of claim 14, wherein said step of detecting a condition of said vehicle opening device further comprises detecting opening and closing of said vehicle opening device, and transmitting a signal to said remote device indicating that said vehicle opening device is opening and closing.

21. The method of claim 20, wherein said indicating step further comprises emitting a series of sounds when said vehicle opening device is opening and closing.

* * * * *